United States Patent

Heinzen et al.

[11] Patent Number: 5,806,414
[45] Date of Patent: Sep. 15, 1998

[54] APPARATUS FOR REMOVING RIND FROM SPHEROIDAL FRUITS AND VEGETABLES

[75] Inventors: Alan Heinzen, Gilroy; Charles Shimmel, Carmel Valley; Rudi Groppe, Gilroy; Erick A. Davidson, Salinas, all of Calif.

[73] Assignee: Heinzen Manufacturing, Inc., Gilroy, Calif.

[21] Appl. No.: 823,332

[22] Filed: Mar. 22, 1997

Related U.S. Application Data

[63] Continuation-in-part of Ser. No. 620,369, Mar. 22, 1996, Pat. No. 5,660,104.

[51] Int. Cl.$^6$ ........................................ A23N 7/00
[52] U.S. Cl. ............................. 99/591; 99/593; 99/594; 99/595; 99/596
[58] Field of Search ................... 99/537–541, 584, 99/588–599, 623; 426/481–483

[56] References Cited

U.S. PATENT DOCUMENTS

| | | | |
|---|---|---|---|
| 3,744,408 | 7/1973 | Palis | 99/595 |
| 4,771,682 | 9/1988 | Ishikawa | 99/593 |
| 5,097,758 | 3/1992 | Fresh | 99/590 |
| 5,105,735 | 4/1992 | Gonzalvo | 99/590 |
| 5,133,250 | 7/1992 | Del Ser Gonzalez | 99/491 |

Primary Examiner—Timothy F. Simone
Attorney, Agent, or Firm—Jeffrey P. Aiello; Aiello Patent Prosecution

[57] ABSTRACT

A processing apparatus and method for removing rind from a spheroidal food article, such as a melon is provided. The apparatus includes infeed and outfeed componentry for conveying melons to be processed into and out of the apparatus, providing an apparatus well suited for use in an automated environment. The infeed componentry includes a positioning device for positioning a melon to be processed between revolving mandrels, for achieving a desired orientation of the melon relative to the mandrels. The mandrels retain the melon on its axis and revolve the melon on its equator. Knife members are positioned on either side of the melon and aligned with the equator thereof when the melon is in an initial position. The knife members have detachable blades to accommodate rinds of different thicknesses, so that the blades extend through the rind, without extending into the flesh. Rollers are secured to the knife members to control the cutting depth of the blades and to enhance the ease with which the rind is cut. As the melon is rotated from the initial positron toward a completed position, the knifes initially remove rind from its equator, then simultaneously toward each pole, for removing substantially the entire rind from the melon. The cutting pattern provided by the invention obviates the need for excessive rotation of the melon, providing a processing apparatus having enhanced processing speeds. Rind remaining on the poles is sliced off without removing excessive flesh from the melon.

20 Claims, 8 Drawing Sheets

APPARATUS FOR REMOVING RIND FROM SPHEROIDAL FRUITS AND VEGETABLES

This is a continuation-in-part of application Ser. No. 08/620,369, filed Mar. 22, 1996, now U.S. Pat. No. 5,660,104.

BACKGROUND OF THE INVENTION

1. Field of the Invention

The present invention relates generally to food process apparatus, and more particularly, to an improved processing apparatus and method for removing rind from spheroidal fruits and vegetables, such as melons.

2. Description of Related Art

There are a number of different prior art machines and implements for processing fruits and vegetables. Most machines and implements are either particularly designed for home use or industrial applications. Implements adapted for home use are typically designed for hand use, or for placement of the implement on a suitable surface, such as the countertop in a kitchen.

The machines designed for industrial use are usually somewhat robust and may be configured for automated processing of food thereby. A number of different fruits and vegetables are processed by industrial machinery, for packing or canning thereof. However, it is well known that fruits and vegetables are many different shapes and sizes, and there are substantial differences between the properties of the flesh and rind or skin of a particular fruit or vegetable. Industrial food processing machines are therefore usually designed for processing a family of fruits or vegetables, or a particular fruit or vegetable. For example, processing of a particular fruit, such as removing the skin from a peach, is usually performed by a particular machine, for maximizing the production capabilities of the machine.

An industrial machine for processing fruits and vegetables is disclosed in U.S. Pat. No. 4,771,682, to Ishikawa. The disclosure is directed to a peeling machine that includes a rotary clamp mechanism for gripping and rotating a fruit or vegetable between a pair of clamp member and a peeling cutter having a cup-shape rotary peeling blade rotated about its center axis by a drive mechanism. The cutter is movable along the profile of the outer skin of the fruit or vegetable, while maintaining the axis of rotation of the rotary blade is held in a direction tangential to the surface of the fruit or vegetable rotating on the rotary clamp mechanism. The peeling blade is rotated about its center axis and brought into contact with the surface of a fruit or vegetable rotating on the rotary clamp mechanism. A cutting edge of the rotary blade is continuously moved in the direction of the fruit or vegetable skin, so that is can sharply cut off relatively difficult fruit or vegetable skin.

U.S. Pat. No. 3,744,408, to Julian O. Palis, is directed to a coconut paring machine that includes pairs of tapered disc shaped drive rolls arranged in an octahedral configuration for holding a coconut between the pairs of drive rolls. Each pair of drive rolls is shaft mounted on supporting members for rotating the respective roll. Left and right pairs of the rolls are first separated for receiving a coconut therebetween, then retracted for gripping the coconut. A single disc shaped cutter is positioned between two rolls of the right pair of drive rolls. The drive rolls are driven by their respective shafts for driving the drive rolls. After the coconut is rotating, the cutter engages the surface of the coconut.

A disadvantage of the disclosed coconut cutter, is the cutter removes the skin of the nut, in a somewhat inefficient pattern. This is caused by the octahedral configuration of the drive rolls and the provision of only a single disc cutter. Particularly, the cutter removes skin from the coconut by first cutting a continuous stripe about the circumference of the nut. Then, as the carriage assembly rotates the axis of the nut, the cutting pattern of the cutter precesses about the surface of the coconut in a broad X-shaped cut, such that the nut is half pared on opposite quadrants before being completely pared. Thus, the carriage means therein must be excessively rotated, 180 degrees, for removing the skin from the nut.

U.S. Pat. No. 5,105,735, to Gonzalvo, discloses a machine for peeling oranges and similar fruits. The disclosed machine consists of a chassis equipped with two arms, and the ends of which are devices for holding the fruit and turning it. The cutter can be fixed, with the fruit being kept in contact through its own weight, the peeling being carried out by angling the axis of the fruit, or it can move round the fruit, and in this case of fruit is fixed. The movement of the cutter in relation to the fruit is proportional, due to the use of demultiplication devices.

U.S. Pat. No. 5,133,250, to Del Ser Gonzalez, is directed to an industrial fruit peeling machine. The disclosed machine includes a base platform with a general arm arranged on the base. The arm has a laterally oriented concavity and fork branches with ends. An actuatable fruit retaining jaw is provided between ends of the fork branches. The forked arm is pivotably moved about a vertical axis, so that the fruit is movable from a fruit collection zone to a peeling zone. Latch means are provided in the peeling zone for fixing a position of the jaw. A pair of sets of knives are arranged on both sides of the jaw, with each set of knives having an approximately semicircumferential distribution. The knives are mounted on a pivot arm that is actuatable in a direction of movement toward and away from the fruit. Also included is a motor mounted on the pivot arm of the knives for actuating the knives in a rotary direction.

Another industrial machine for processing fruits and vegetables is disclosed in U.S. Pat. No. 5,097,758, to Fresh. The disclosed therein is a fruit and vegetable peeler that includes a tong assembly having flexible grater plates resiliently connected across spaced apart joints of the assembly. The tong assembly is mounted to a support plate having a food article receiving aperture formed therethrough. The grater plates are positioned for access through the aperture. In use, a pronged chuck spins a food article, such as a carrot. The food article is lowered through the aperture, between the grater plates. The tong assembly has tong handles connected to the grater plates for closing the plates. The plates are closed to abrasively engage the food article to remove a surface layer therefrom.

Although the devices disclosed in the above enumerated prior art references have improved features, there still exists a need for a processing apparatus and method for removing rind from spheroidal fruits and vegetables, such as melons.

OBJECTS OF THE INVENTION

It is therefore an object of the present invention to provide a processing apparatus and method for removing rind from spheroidal fruits and vegetables, and particularly melons;

It is another object of the present invention to provide a processing apparatus for removing rind from spheroidal fruits and vegetables that is well suited for use in an automated environment;

It is a further object of the present invention to provide a processing apparatus for removing rind from spheroidal fruits and vegetables that removes the rind of the melon without removing an excessive amount of the flesh therefrom;

It is yet another object of the present invention to provide a processing apparatus and method for removing rind from spheroidal fruits and vegetables that is capable of removing the rind from spheroidal fruits and vegetables having substantially different dimensions; and It is a still further object of the present invention to provide a processing apparatus and method for removing rind from spheroidal fruits and vegetables that removes the entire rind therefrom.

SUMMARY OF THE INVENTION

These and other objects and advantages of the present invention are achieved by providing an improved processing apparatus and method for removing rind from spheroidal fruits and vegetables, and particularly melons. The apparatus of the present invention includes conveyance means for conveying melons to be processed into and out of the invented apparatus, providing an apparatus that is well suited for use in an automated environment. In the preferred embodiment, the conveyance means includes positioning means for positioning the melon to be processed between revolving means and for achieving a desired orientation of the melon relative to the revolving means.

The invented processing apparatus also includes a carriage assembly that includes the revolving means for revolving the melon on its equator. The revolving means are aligned with a first axis when the carriage assembly is in an initial position. The revolving means engage poles of the melon and retain the melon on its axis, so that the axis of the melon is aligned therewith for revolving the melon on its equator.

The revolving means preferably includes engaging means for engaging the poles of the melon. The engaging means extend slightly into the rind for engaging the melon, as the melon is revolved by the revolving means. Disengaging means, such as a spring member may also be provided for releasing the rind from the engaging means.

A floating cutting assembly is located adjacent to the carriage assembly. The cutting assembly includes a pair of diametrically opposed knife members that are positioned on either side of a melon engaged by the revolving means, and preferably aligned with the equator of the melon when the carriage assembly is in the initial position. The knife members each include a detachable blade portion that is configured to extend through the rind of the melon, without extending substantially into the flesh thereof. Different depth blades can be coupled to the knife members for accommodating the varying thickness of the rinds of different melons, so that the blades extend through the rind of the melon, without extending substantially into the flesh. The removable blades also provide ease of replacement thereof, when a blade becomes dull or breaks, for example. Preferably, the knife members reciprocate to enhance the ease with which the blades cut through the rind for increasing cutting speed.

Rollers are mounted on the knife members adjacent to the blade to enhance the ease with which the knife members cut rind for providing a cleaner cut of the rind and increasing cutting and processing speed of the invented apparatus. The rollers also control the cutting depth of the blades, to prevent the blades from extending excessively into the flesh and remove flesh from the melon.

The distance between the knife members in each of an initial position and an engaged position is adjustable to accommodate different types of melons having different diameters. Preferably the distance between the knife members is adjustable to accommodate melons ranging in diameter from approximately 4 to 10 inches. The cutting assembly further includes means for enabling the knife members to track changes in the curvature of the melon's surface. The tracking means cause the rollers to exert a slight, even pressure on the rind of the melon, to aid with the blades cutting the rind of the melon, without extending into the flesh thereof.

The present invention further includes rotating means for rotating the carriage assembly between the initial position and a completed position, and parallel to the first axis. The rotating means includes drive means coupled to the revolving means and to the carriage assembly. The drive means drives the revolving means at the first velocity and rotates the carriage assembly at a second velocity. The first velocity is substantially greater than the second velocity, so that the melon revolves quickly on its equator as the carriage assembly is rotated to the completed position.

In use, the invented processing apparatus is activated for initializing a processing cycle. The revolving means first engage the poles of the melon, then begin revolving the melon on its equator as the blades of the knife members extend into the rind of the melon, for removing rind from the melon along its equator. The rotating means rotates the carriage assembly from the initial position toward the completed position. As the melon is rotated about its axis from the initial position to the completed position, the revolving means revolve the melon on its axis, with the knife members continuously removing rind from the melon. Both knife members simultaneously remove the rind from the melon in an efficient cutting pattern that extends from the equator of the melon and simultaneously precesses toward each pole. Thus, the cutting pattern provided by the present invention obviates the need for substantial rotation of the carriage means, for providing a processing apparatus having enhanced processing speeds. Preferably, the carriage means is rotated less than approximately 90° from the initial position to the completed position, while the knife members remove rind from greater than approximately 220° of the melon's surface. Therefore, when the carriage assembly reaches the completed position, almost the entire rind of the melon has been removed, without removing excessive flesh therefrom.

Once the completed position is reached by the carriage assembly, the knife members are withdrawn from the melon. Rind remaining on the melon adjacent to its poles is removed and surrounding the revolving means, without removing excessive flesh, to remove the entire rind from the melon and disengage the melon from the revolving means. The processed melon is released to the conveying means for removing the melon from the apparatus for further processing of the melon. The carriage assembly is then rotated back to the initial position for receiving the next melon to be processed and begin the next processing cycle. The invented apparatus rapidly processes melons, with each processing cycle taking approximately 10 seconds, resulting in an efficient apparatus for processing spheroidal fruits and vegetables, such as melons.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein.

Figure 1:
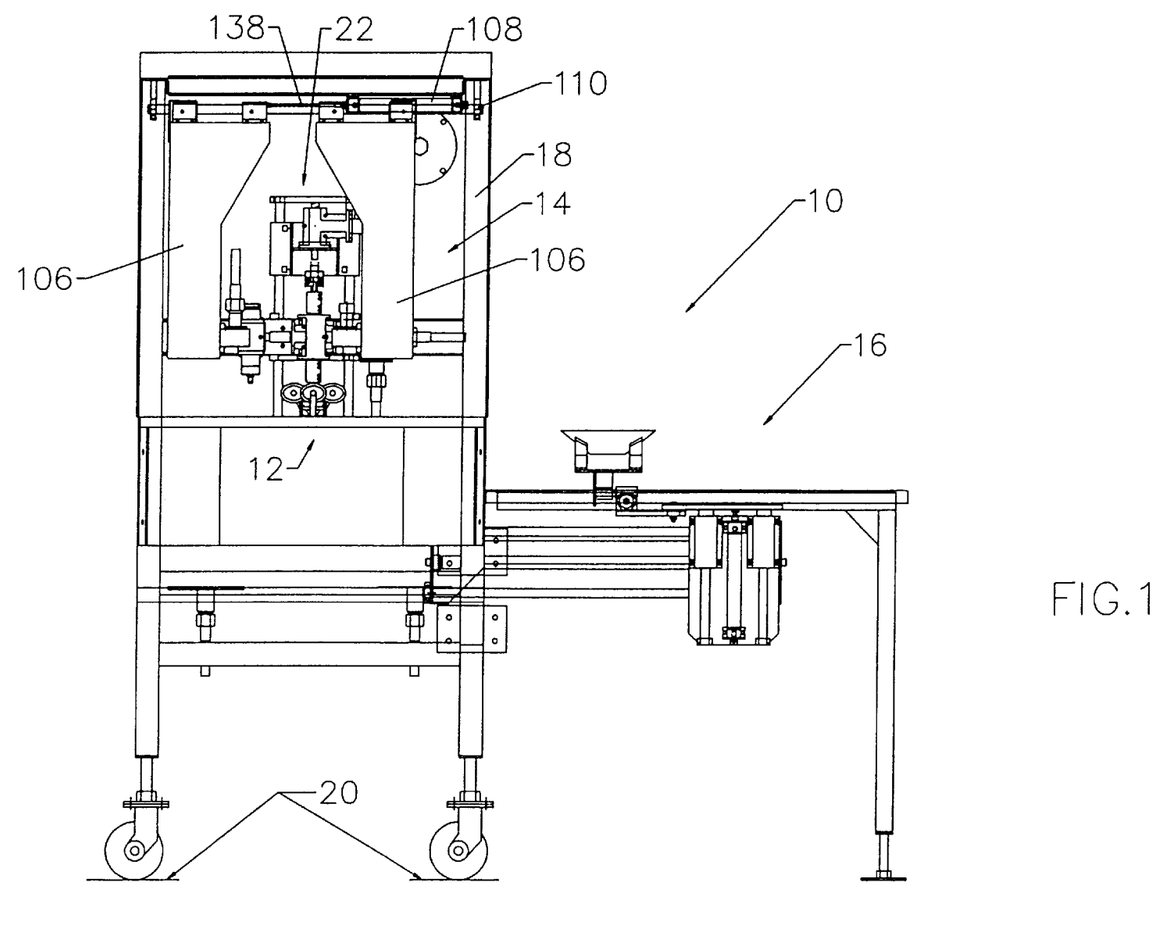
FIG. 1 is a front elevational view showing a preferred embodiment of an apparatus for removing rind from spheroidal fruits and vegetables, and particularly melons constructed according to the principles of the present invention.

Referring now to FIG. 1 of the drawings, there is shown generally at 10, a preferred embodiment of an improved processing apparatus for removing rind from spheroidal food articles, and particularly melons, constructed according to the principles of the present invention. The invented apparatus 10 includes an infeed assembly 12, processing assembly 14 and a discharge assembly 16. The infeed assembly 12, processing assembly 14 and discharge assembly 16 coact to provide an apparatus 10 that is well suited for use in an automated environment.

The apparatus 10 of the present invention includes a support frame 18 that preferably comprises a suitable commercial grade, rigid metal alloy for supporting the processing assembly 14 and may be configured to different desired dimensions for retaining the processing assembly 14 at different desired heights above a ground surface 20, depending upon the desired location of the apparatus 10, such as in an automated food processing plant (not shown). A shield 17 may be secured to the frame to prevent matter from striking an operator of the apparatus 10 while melons are being processed thereby. Additionally, the assemblies 12, 14, 16 comprising the apparatus 10 of the present invention is preferably fabricated from suitable food grade metal alloys and polymeric materials, as is well known in the art, so that the apparatus 10 may be used in any desired commercial or industrial setting.

Figure 2:
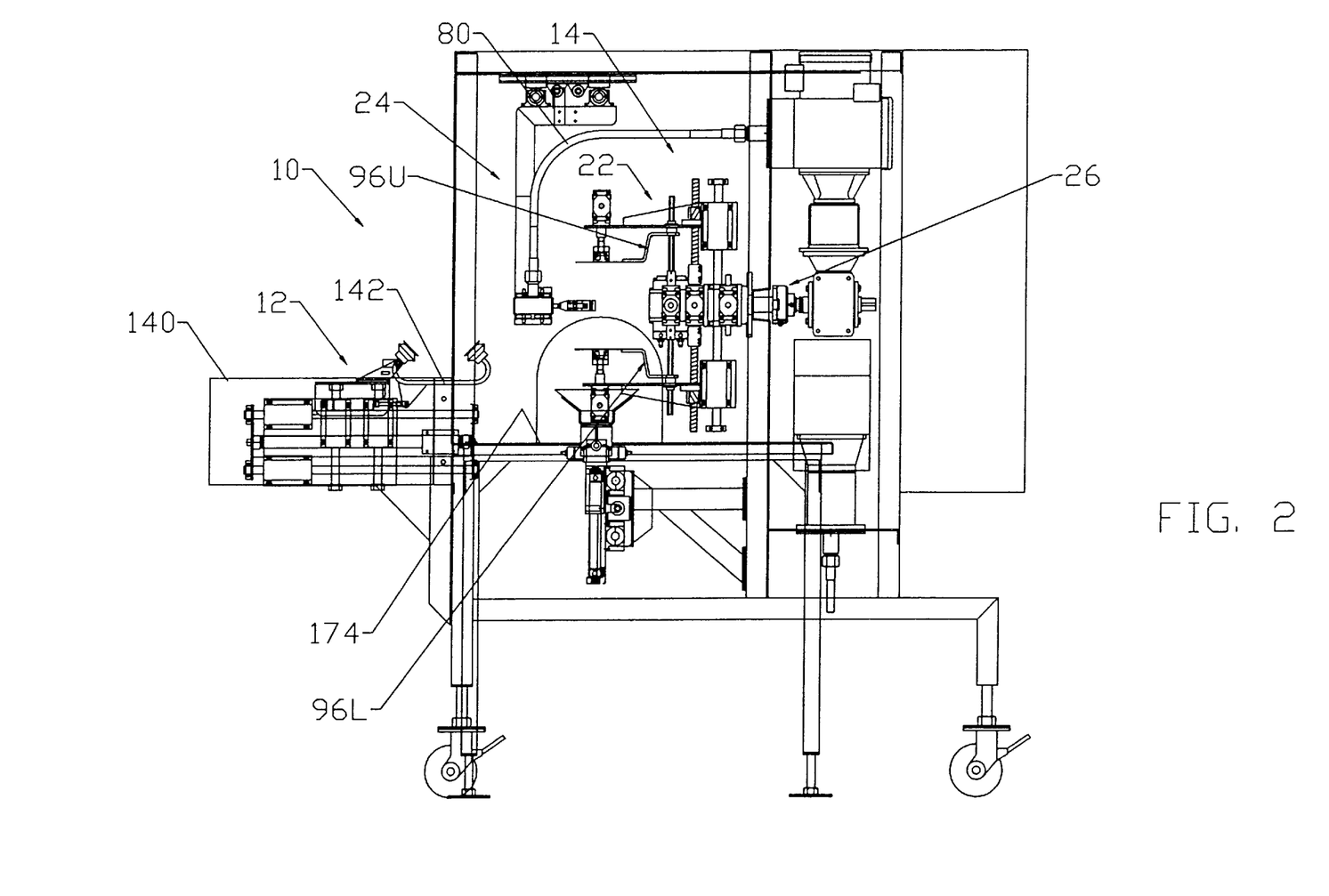
FIG. 2 is a side elevational view showing the preferred embodiment of the present invention.
Figure 3:
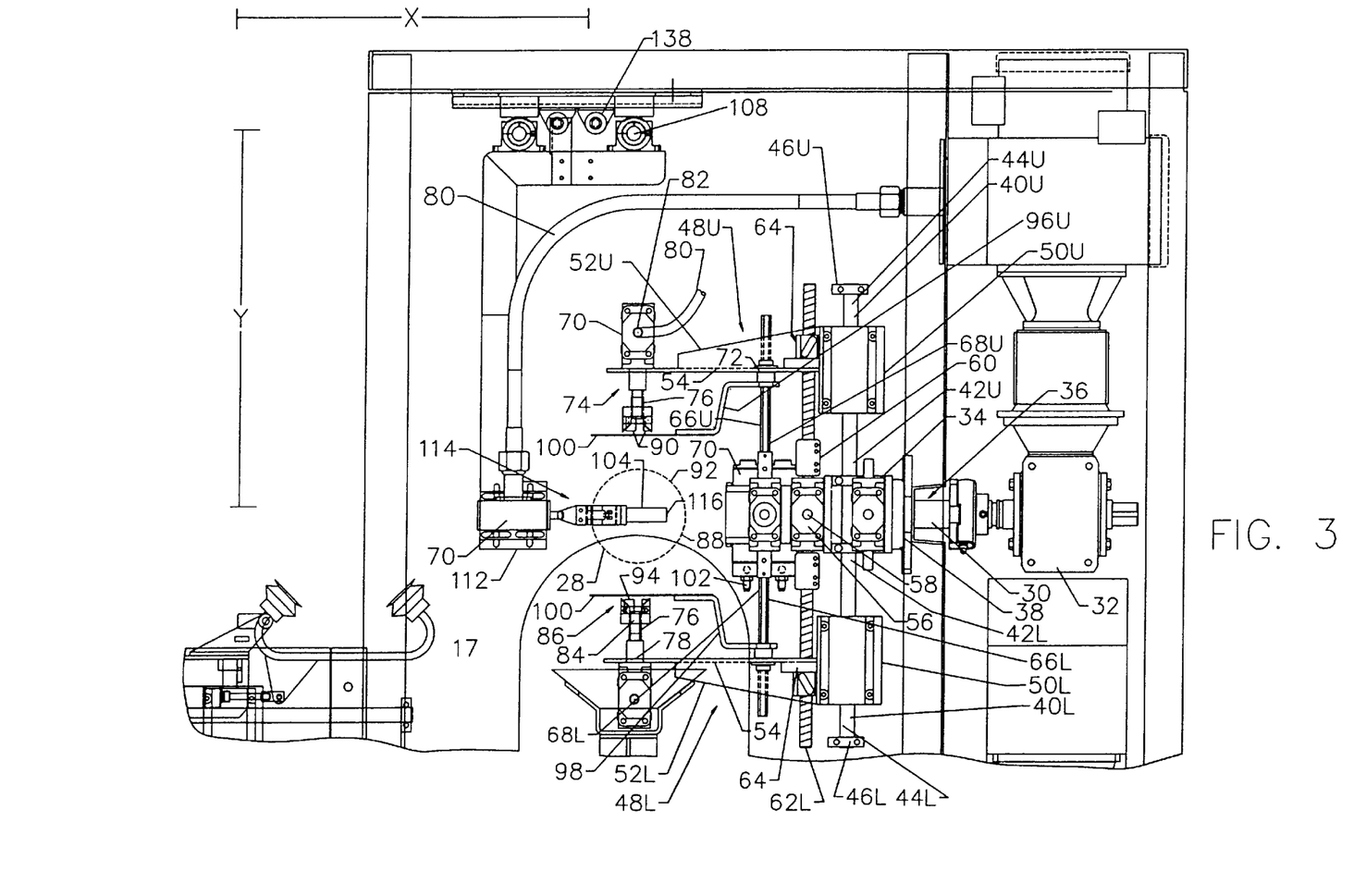
FIG. 3 is an enlarged side elevational view showing the preferred embodiment of the apparatus of the present invention.

Referring to FIGS. 1–3, FIG. 8, and particularly to FIG. 3, the processing assembly 14 of the apparatus 10 of the present invention includes a carriage assembly 22, a floating cutting assembly 24, and rotating means 26 for rotating the carriage assembly 22. The carriage assembly 22 is provided to engage and rotate a melon 28 for processing thereof. The carriage assembly 22 is coupled to the rotating means 26 for rotating the carriage 22 from an initial position, where the carriage 22 is preferably generally aligned with a Y axis, to a completed position shown in FIG. 8. The rotating means 26 includes a drive shaft 30 coupled at one end to a suitable power source, such as an electronic motor 32 and coupled at the other end to a rotational gearbox 34 that is coupled to the carriage assembly 22. The drive shaft 30 extends through an aperture 36 in the frame 18 and an annular bearing 38 bolted to the frame 18. The gearbox 34 is preferably configured for bidirectional operation for rotating the carriage 22 from the initial position, to a completed position, wherein the carriage 20 extends obtusely to an X axis.

The carriage assembly 22 includes an upper pair of guide shafts 40U and a lower pair of guide shafts 40L. The each pair of shafts 40 have an inner end 42U, 42L secured to the rotational gearbox 34 and an outer end 44U, 44L affixed to a spacing plate 46U, 46L for maintaining a desired distance between the shafts 40. An upper support arm 48U and lower support arm 48U each have a rear portion 50U, 50L and a front portion 52U, 52L. The rear portion 50 of each of the arms 48 is slidably coupled to the guide shafts 40, for guiding movement of the arms 48 along the Y axis. The arms 48 are preferably are configured with an L-shaped cross sectional configuration and have a plate portion 54 extending between the front and rear portions 50, 52.

A type one drive coupling 56 is secured to the gearbox 34. The type one drive coupling 56 may comprise any suitable commercially available drive coupling having an input 58 and a pair of preferably opposing outputs 60. A preferred commercially available drive coupling is sold under the trademark MITERPAK, manufactured by MiterPak, Uxbridge, Mass.. The drive coupling 56 is preferably configured for rotating the outputs 60 thereof in the same direction, or in opposite directions, as dictated by the application of the coupling 56.

Upper and lower ball screws 62U, 62L are secured to the outputs 60 of the type one drive coupling 56 and threadably coupled to the plate portion 54 of each of the upper and lower support arms 48. The plates 54 each have a ball nut 64 bolted thereto adjacent to the rear portion 50 and threadably coupled to the associated ball screw 62. In operation, the ball screws 62 are simultaneously rotated, in either a clockwise or counterclockwise direction, by the drive coupling 56 for simultaneously threading the ball nuts 64 along the screws 62 for drawing the arms 48 toward each other, or for spreading the arms 48.

Additionally, upper and lower linear guides 66U, 66L may be provided for limiting movement of the arm 48 caused by rotating melons 28 therebetween. Each linear guide 66 may comprise a substantially thin rod member, preferably configured with a somewhat hexagonal cross-sectional configuration. The guides 66a coupled at an inner ends thereof 68 to a type two drive coupling 70 and are disposed through apertures 72 in the plates 54 of the arm 48 located proximal to front portions 52 thereof.

Referring still to FIGS. 1–3 and FIG. 8, revolving means 74 for revolving the melon 28 about its axis are coupled to the forwardly projecting front portions 52 of the support arms 48.

The revolving means 74 comprises a pair of inwardly projecting, diametrically opposed mandrels 76, with each mandrel 76 secured to the plate 54 of a support arm 48, at the front portion 52 thereof. Each mandrel 76 is disposed through an opening 78 in the plate 54 and coupled to a type two drive coupling 70, for rotating the mandrel 76. A flexible drive shaft 80, such as any known suitable flexible drive shaft is connected to an input 82 of the drive 72 and to an appropriate power source, such as an electronic motor 32 for rotating the flexible shaft 80, for revolving the mandrels 76.

Ends 84 of the mandrels 76 are provided with an engagement assembly 86 for positively engaging the melon's rind 88 for rotating the melon 28. The engagement assembly 86 comprises a plurality of engagement blades 90 dimensioned to extend slightly into the melon's rind 88 for engaging the melon 28 at poles 92 thereof. The engagement assembly 86 also includes a spring means 94 for releasing rind 88 retained on the blades 90 after peeling of the rind 88 from the melon 28 is completed.

Means for slicing the rind 88 surrounding the poles 92 of the melon 28 and for releasing is the melon 28 from the engaging assembly 86 are provided adjacent thereto. In the preferred embodiment of the present invention, the slicing means comprises upper and lower pole cutting members 96U, 96L coupled to the guides 66. Each pole cutter 96 has an angled arm 98 affixed to a guide 66 proximal to the support arm 48 and an elongated slicing blade 100 attached to the arm 98. The arm 98 is shaped to allow the cutting blade 100 to extend adjacent to the associated engagement assembly 86, while the cutting blade 100 is sufficiently long for extending through the pole 92 of the melon 28 for removing the rind 88 therefrom.

Preferably pneumatic actuation means 102 are coupled to the type two drive coupling, for rotating the guides 66 about the Y axis. The guides are rotated for simultaneously rotating the cutting members 96 from a home position, wherein the blades 100 are a desired distance from the melon 28, to an extended position, wherein the blades 100 have extended through the melon's pole 92 and the rind 88 is removed. Once the rind 88 is removed from the poles 92, the melon 28 is released from the mandrels 76 and is discharged into the discharge assembly 16 for further processing, if desired. Thus, the cutting members 96 slice the rind 88 from the pole 92, without removing excessive flesh 104 from the melon 28. After the melon 28 is discharged into the assembly 16, the spring means 94 pushes outwardly on any rind 88 remaining on the blades 90 for releasing rind 88 retained thereon.

Figure 8:
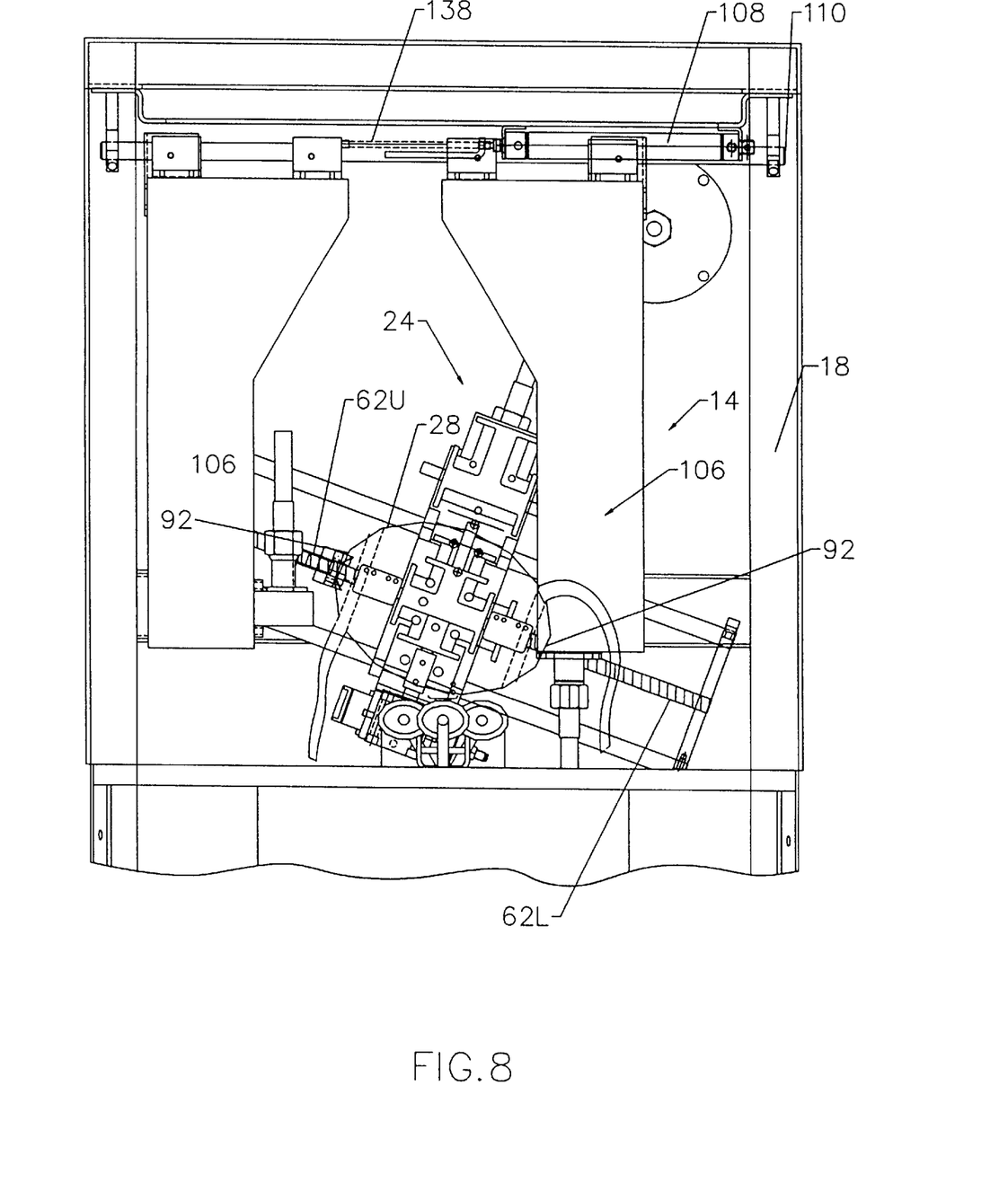
FIG. 8 is an enlarged side elevational view showing a processing assembly of the preferred embodiment of the apparatus of the present invention in a completed position.

Preferably, the mandrels 76 are rotated approximately 30 times faster than the gearbox 34 rotates the carriage assembly 20, thus for every 30 revolutions of the mandrels 76, the carriage assembly 22 is rotated one complete revolution. Therefore, there is one complete revolution of a melon 28 engaged by the mandrels 76 for every 12° that the carriage assembly 22 is rotated by the gearbox 34. Accordingly, one processing cycle of the invented processing apparatus 10, rotates the carriage assembly 22 approximately 80° from its initial position, wherein it is aligned with the Y axis, to the completed position for peeling the melon 28, wherein the carriage 20 extends obtusely to the X axis and back to the initial position for receiving subsequent melons 28. For this amount of rotation, the mandrels 76 rotate the melon approximately 6.6 revolutions for removing rind 88 from greater than approximately 220° of the melon's surface area.

Referring now to FIGS. 1–3, and FIGS. 7A–7E of the drawings, there is shown the floating cutting assembly 24 of the preferred embodiment of the invented apparatus 10 for removing rind from spheroidal food articles, such as melons 28. The cutting assembly 24 includes a pair of downwardly projecting arms 106 that are slidably coupled to linear guides 108 affixed to the frame 18. An actuation source 110, that is preferably pneumatic, is connected to the arms 106 for adjusting the spatial positioning thereof. The actuation source 110 adjusts the arms 106 along the guides 108 in the X axis between an initial position, shown in FIG. 1, wherein there is a sufficient distance between the arms 106 to dispose a melon 28 therebetween, and an engaged position, wherein the arms are adjusted towards each other, for removing rind 88 from the melon.

Each arm 106 has a lower inwardly projecting portion 112 with a knife member 114 coupled thereto. The knife members 114 are positioned on the projecting portions 112, such that the knives 114 project inwardly toward the revolving means 74, and are oriented such the knives 114 are diametrically opposed along an equator 116 of the melon 28, when the carriage assembly 22 is in the initial position. Each knife member 114 is secured to the corresponding arm portion 112 with a gimbaled head 113 for allowing the knives 114 to oscillate in the Y axis for tracking the curvature of the melon's rind 88 when peeling the rind 88.

Each knife member 114 is coupled to a one input-one output type two drive coupling 70 mounted on the projecting portion 112 of the arms 106. Each of the drive couplings 70 is connected to flexible shaft 80 for reciprocating the knives 114 at a fairly high rate. The reciprocating knives 114 when contacting the rind 88, enhance the ease with which the knives 114 cut through the melon's rind 88 for increasing the process speed of the melons 28. The distance between the knives 114 in each of the initial and engaged positions is adjustable to accommodate different types of melons 28 having different diameters. Preferably the distance between the knife members 114 is adjustable to accommodate melons 28 ranging in diameter from approximately 4 to 10 inches.

The knife members 114 each include a mounting assembly 118 supporting a peeling blade assembly 120. In the preferred embodiment 10, the mounting assembly comprises a mounting plate 122 and a complementary formed blade holding plate 124 for detachably securing the blade assembly 120 therebetween. Preferably, the peeling blade assembly 120 includes a support plate 126 secured between the plates 122, 124 for fastening the peeling blade assembly 120 to the mounting assembly 118. A U-shaped peeling blade 128 having an inclined peeling surface 130 is attached to a mounting bracket of 132 for securing the blade 128 to the blade assembly 120. The inclined surface 130 of the blade 128 of each knife member 114 has a particular peeling blade inclination to enhance cutting depth control of the blade 128, as each knife member 114 is brought toward its respective pole 92, when processing the melon 28. Thus the rind 88 is efficiently removed, without the peeling surface 130 extending substantially into the flesh 104, to prevent extensive flesh 104 from being removed from the melon 28.

In the preferred embodiment, the blade assemblies 120, including their peeling blades 128 are removable and interchangeable. The blades 128 are secured to the mounting brackets 132 using suitable means such as nut-bolt combinations 134, for example. Different depth peeling blades 128 can be coupled to the blade assemblies 120 for accommodating the varying thickness of the rinds 88 of different melons 28, so that the peeling surface 130 of the blades 120 extends through the rind 88 of the melon 28, without extending substantially into the flesh 104. Preferably, the blade 128 is dimensioned to extend just through the rind 88, without extending into the flesh 104. The blades 128 are easily removed and also provide ease of replacement thereof, when a blade 128 becomes dull or breaks, for example.

As shown in FIGS. 7A–7E, in the preferred embodiment, at least one roller 136 is fastened to the mounting bracket 132 adjacent to the peeling blade 128. Most preferably, a pair of rollers 136 are fastened to the mounting bracket 132, with a roller 120 disposed on either side of the blade 128. The rollers 136 are provided to enhance the ease with which the knife members 114 pass over the melon's rind 88 for providing a cleaner cut of the rind 88 and increasing cutting and processing speed of the invented apparatus 10. The rollers 136 additionally facilitate the removal of rind 88 remaining between the inclined peeling surface 130 and the rollers 136.

The floating cutting assembly 24 further includes means for enabling the knife members 114 to track changes in the curvature of the rind 88. The tracking means preferably cause the knives 114, and particularly the rollers 136, to exert a slight, even pressure on the rind 88, to aid with maintaining a constant cutting depth of the blades 128, without extending into the flesh 104 thereof. In the preferred embodiment, the tracking means comprise a desired one of a pneumatic or spring tension assembly 138 that is secured to the frame 18 and linear guides 108 and coupled to the arms 106. The spring tension assembly 138 preferably causes the arms 106, and thus the knife members 114 to exert approximately 8–15 pounds of pressure on the rind 88 for maintaining cutting depth of the blades 128. The spring assembly 138 in combination with the gimbaled head 113 of the knives 114, inclined peeling surface 130 of the blades 128, and dimensioning of the blades 128 coact to provide optimal cutting of the rind 88, without extending into the flesh 104, for optimal processing of the melon 28.

Figure 4:
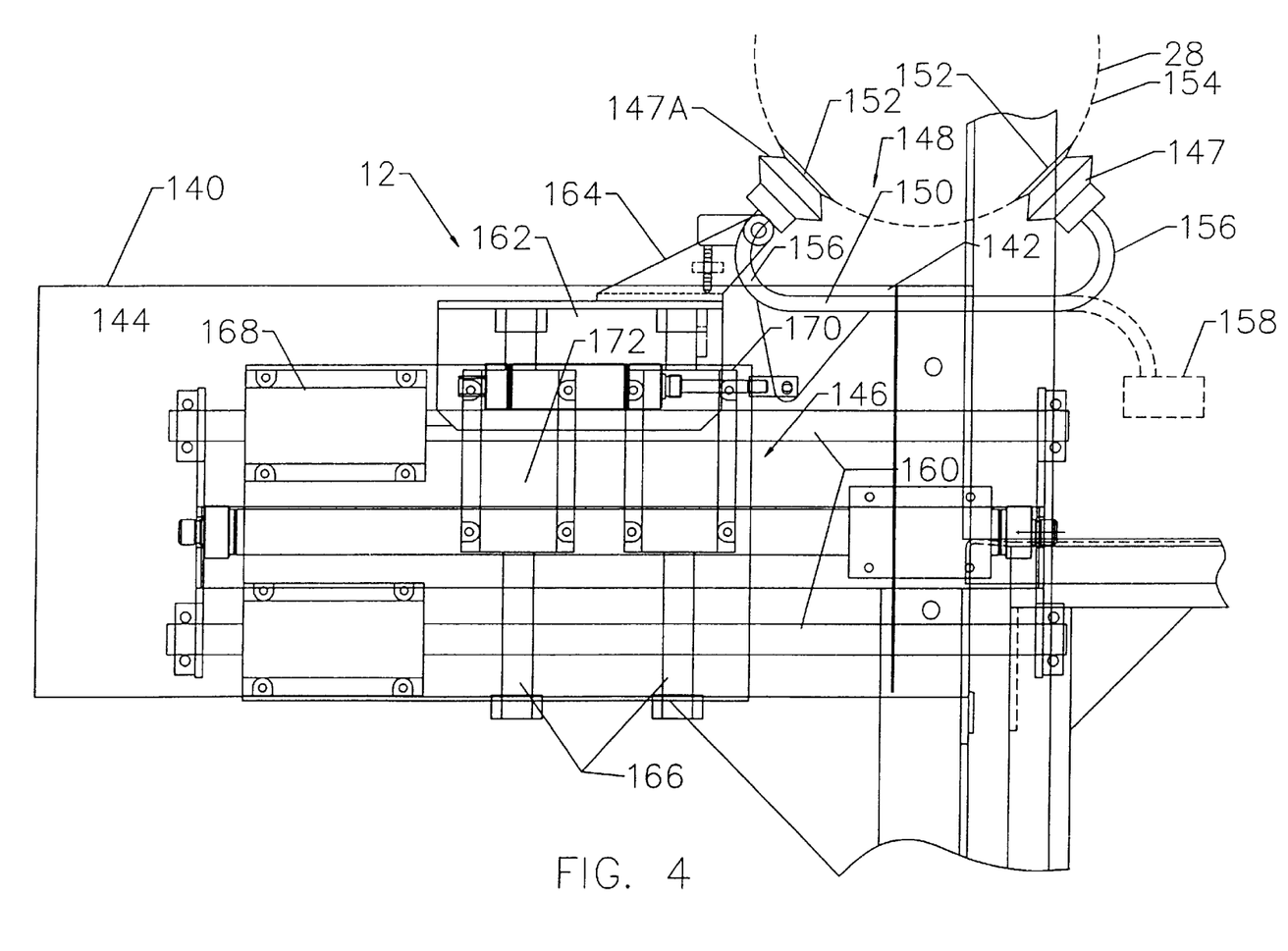
FIG. 4 is an enlarged side elevational view showing an infeed assembly of the preferred embodiment of the invented apparatus.

Referring to FIG. 2 and FIG. 4 of the drawings, the infeed assembly 12, of the invented processing apparatus 10 is shown. The infeed assembly 12 includes an infeed platform 140 secured to the frame 18. The platform 140 has a shallow channel 142 formed therein secured to the frame 18. A guide plate 144 extends beneath the platform 140 and adjacently to the channel 142. An infeed conveyance assembly 146 is secured to the guide plate 144 for supporting the conveyance assembly 146. The conveyance assembly 146 includes positioning means 148 for positioning and supporting a melon 28 thereon.

The positioning means 148 comprises a plurality of spatially positioned, substantially flexible retaining cups 147 coupled to support arms 150. In the preferred embodiment three cups 147 are provided and arranged in a triangular configuration. The cup support arms 150 are provided for supporting the cups 147 and for obtaining an angular relationship of the cups 147, wherein a periphery 152 of each cup 147 mates with the melon's surface 154. The cups 147 preferably comprise a pliable food grade polymeric material.

The support arms 150 comprise any suitable light material, such as aluminum for example, and are configured with curved upturned end portions 156 for maintaining the angular relationship of the cups 147. A rearmost one of the cups 147A is coupled to a vacuum source 158 for applying a suction force to a melon 28 retained by the positioning means 148. The vacuum source 150 preferably applies from approximately 10 to 15 inches of mercury to the cup 147A for retaining the melon 28 therein. The angular relationship of the cups 147, along with the suction force applied to the rearmost cup 147A, prevent the melon 28 from inadvertently detaching from the positioning means 148 and for maintaining a preferred orientation of the melon 28 relative to the mandrels 76, wherein the poles 92 are engaged thereby.

Upper and lower guide rails 160 are provided for slidably supporting the positioning means 148. The guide rails 160 also prevent inadvertent horizontal movement of the positioning means 148, such as the positioning means 148 inadvertently tilting from side to side, when the positioning means 148 is conveyed toward the processing assembly 14.

An infeed bracket 162 is provided to couple the positioning means 148 to the guide rails 160. The infeed bracket 162 comprises an infeed support plate 164 coupled to the positioning means 148 and to a pair of vertically extending support shafts 166 slidably coupled to the guide rails 160. The infeed support plate 164 is coupled to a pneumatic source 168 that controls horizontal movement of the positioning means 148, such as actuating the positioning means 148 from an infeed position that enables a user to place the melon 28 in the positioning means 148, shown in FIG. 4, to a processing position wherein the melon 28 is engaged by the mandrels 76. A height adjustment means 170 is coupled to the vertical support shafts 166 for adjusting the position of the position of the means 144 along the Y axis. Preferably, the height adjustment means 170 includes a spring mechanism, and is activated, such that when the positioning means 148 is in the engaged position, the height adjustment means 170 slightly lowers the positioning means 148, for causing the lower mandrel 76L to first engage the melon 28.

Figure 5:
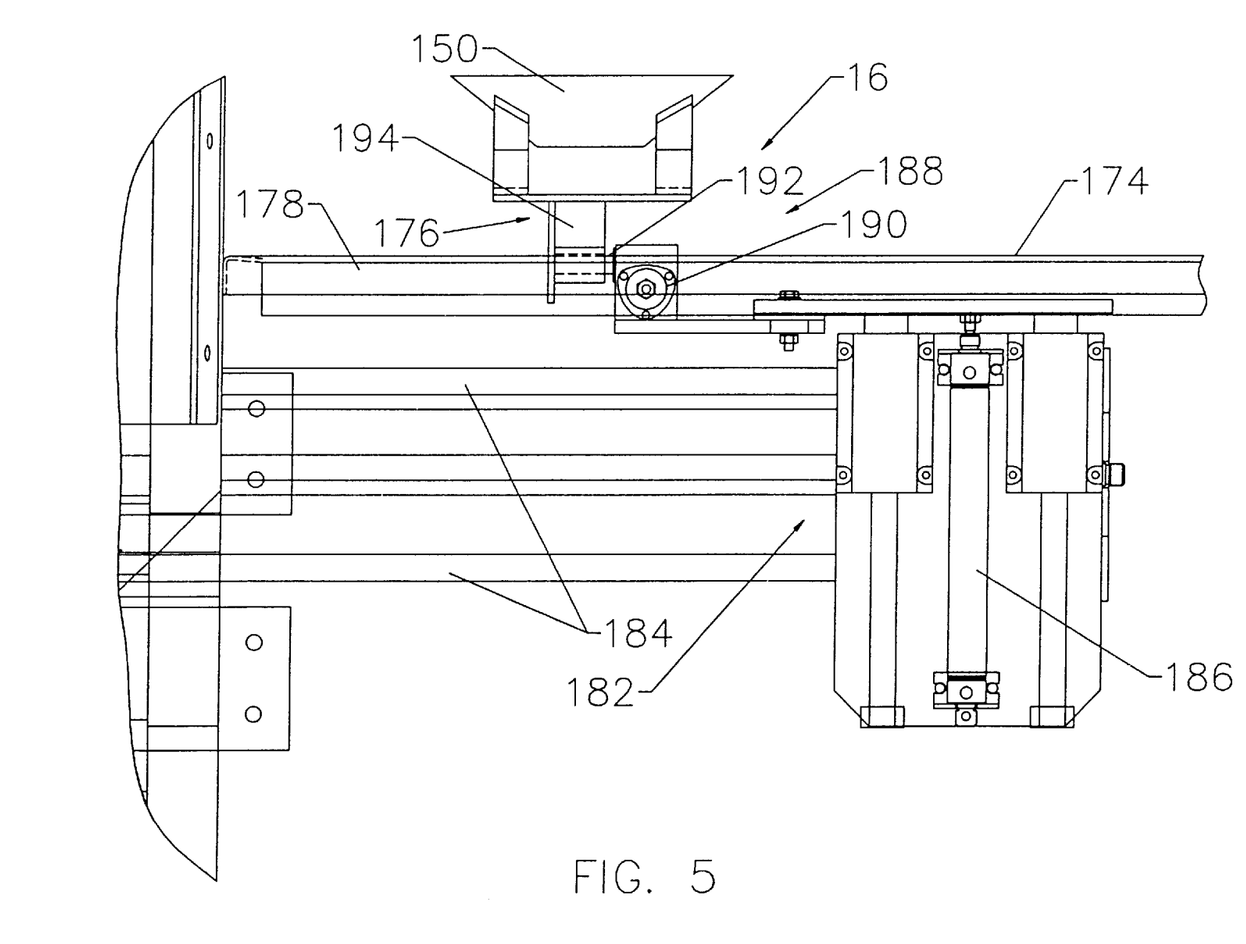
FIG. 5 is an enlarged side elevational view showing a discharge assembly of the present invention.
Figure 6:
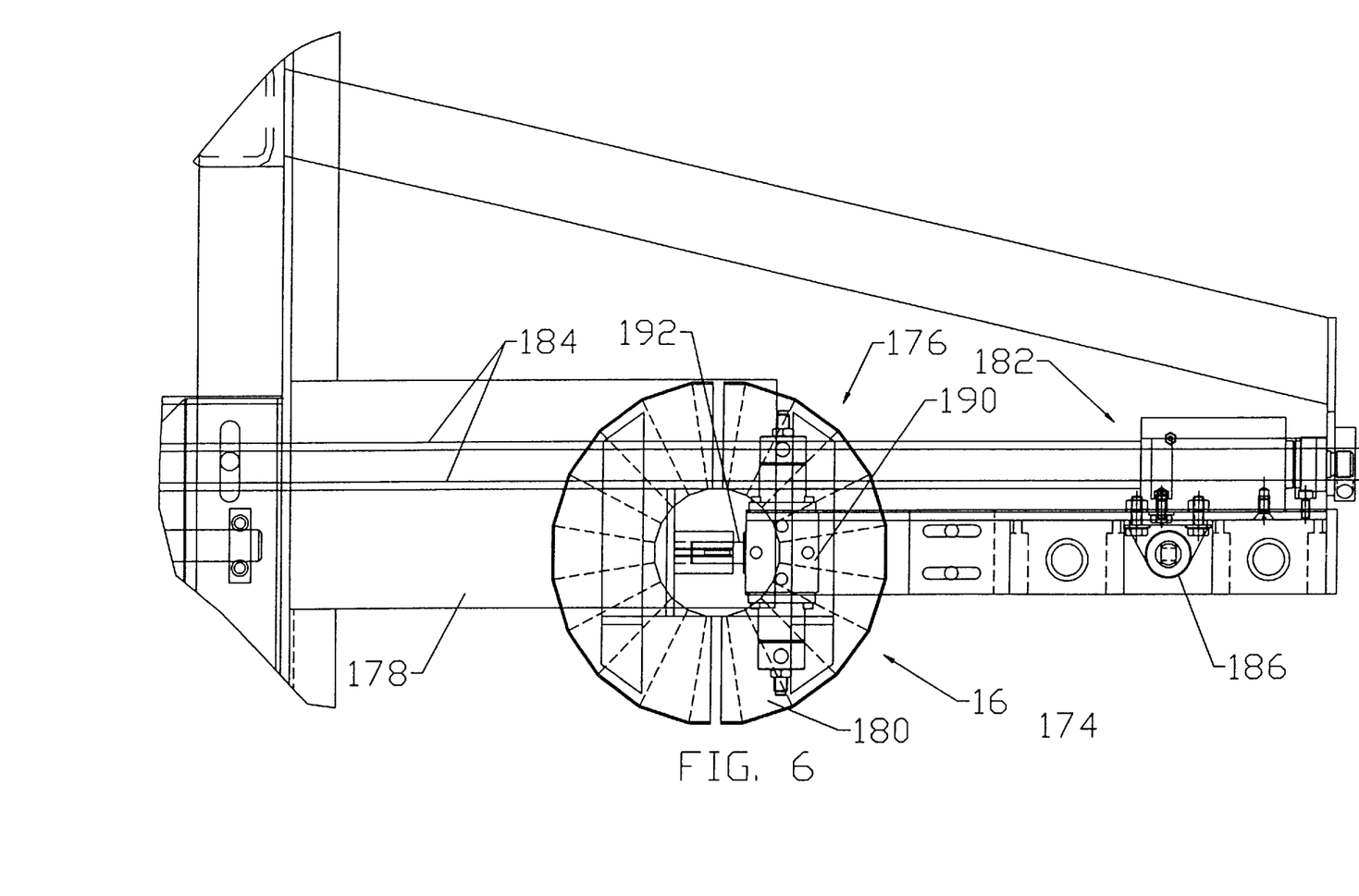
FIG. 6 is a plan view showing the discharge assembly of the present invention.
Figure 7A:
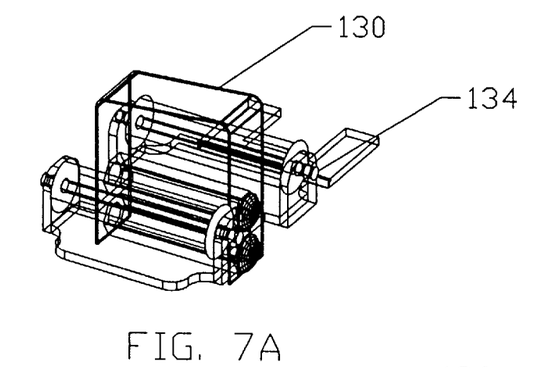
FIGS. 7A–7E is a front elevational, schematic view showing a knife member of the preferred embodiment of the apparatus of the present invention.
Figure 7B:
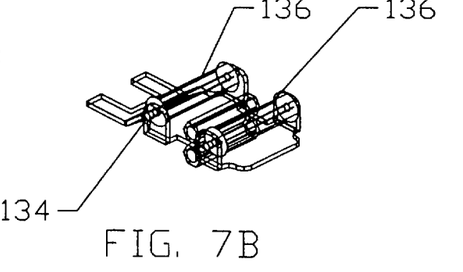
Figure 7C:
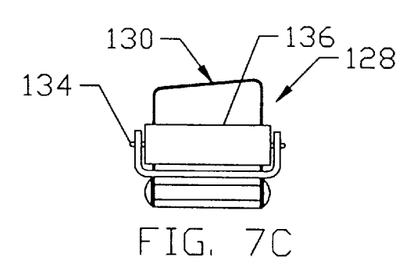
Figure 7D:
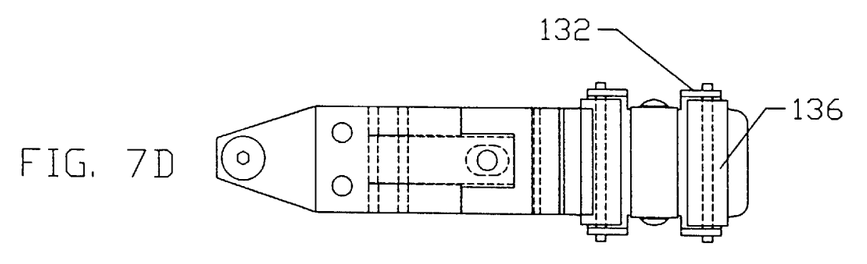
Figure 7E:
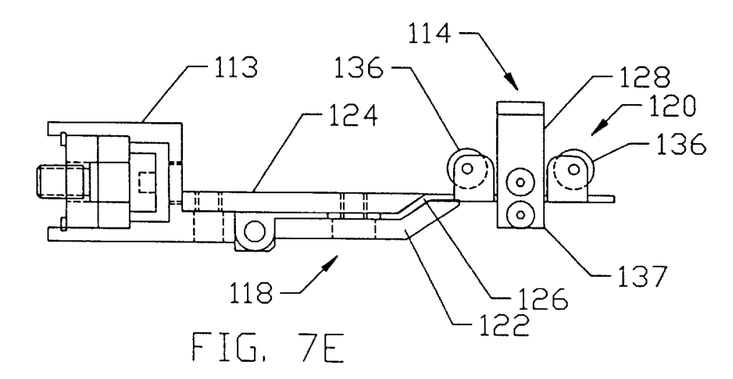

Referring to FIG. 5 and FIG. 6, the discharge assembly 16 includes a discharge table 174 for receiving peeled melons attached to the frame 18. It is to be understood that the invented processing apparatus 10 may be configured for discharging melons 28 to either the right side or left side of the infeed assembly 12 as desired, or demanded by location of the apparatus 10 to peripheral processing machinery, for example, a melon receiving assembly 176 travels along an elongated channel 178 formed in the table 174. The melon receiving assembly 176 includes a concave bowl 180 dimensioned to receive a peeled melon 28 and a conveyance means 182 for adjusting the bowl 180 between a receiving position and a discharge position. The conveyance means 182 includes a pair of horizontal guide rails 184 for supporting the receiving assembly 176 and pneumatic actuation means 186 for adjusting the assembly 176 between the discharge and receiving positions.

A tilting mechanism 188 is coupled between the actuation means 186 and receiving assembly 176. The tilting mechanism 188 includes a pneumatic source 190 for rotating the bowl 180 between a receiving position, wherein the bowl 180 is aligned with the Y axis, and a discharge position, wherein the bowl 180 is rotated along the Y axis, such that the bowl 180 is rotated toward the table 174, causing the peeled melon 28 to roll out of the bowl 180, to enable a user to receive the melon 28. The tilting mechanism 188 is also provided with a cantilevered arm 192 coupled to a pedestal 194 affixed to the bowl 180. The cantilevered arm 192 is actuated for raising the bowl 180, when the assembly 176 is in the receiving position and lowering the bowl 180, when the assembly 176 is in the discharge position.

Referring now to the drawing Figures, a processing cycle using the preferred embodiment of the invented apparatus 10 is initialized by activating the apparatus 10. Upon activation, the carriage assembly 22 is in the initial position, wherein the carriage 22 is aligned with the Y axis, and the positioning means 148 are in the infeed position for receiving the melon 28. A melon 28 to be peeled is placed in the positioning means 148, and oriented such that the poles 92 thereof are aligned with the Y axis.

Once the melon 28 is placed in the positioning means 148, the means 148 senses the weight of the melon 28. The vacuum source 158 is activated for retaining the melon 28, and the pneumatic source 168 is activated to move the positioning means 148 from the infeed position to the processing position, thus conveying the melon 28.

Once the positioning means 148 is in the processing position, the height adjustment means 162 lowers the positioning means 148, thus lowering the melon 28. The carriage assembly 22 senses this action and the type one drive coupling 56 is activated for rotating the ball screws 64 for drawing the arms 48 toward each other. The arms 48 are drawn together until the engagement assemblies 86 of the revolving means 74 engage the poles 92 of the melon 28, with the lower engagement assembly 86L contacting the rind 88 prior to the upper assembly 86U contacting the rind 88. Once the melon 28 is contacted by each of the assemblies 86, the height adjustment means 162 causes the positioning means 148 to release the melon 28 and the positioning means 148 and infeed assembly 12 return to the infeed position for receiving the next melon 28 to be processed.

The flexible drive shaft 80 then begins rotating the type two drive couplings 70 for rotating the melon 28 about its axis and revolving the melon 28 on its equator 116. The floating cutting assembly 24 is then activated to draw the assembly 24 from its initial position to the engaged position, until the blades 128 of the knife members 114 contact the rind 88 and commence peeling the rind 88 from the melon 28, so that the blades 128 of the knife members 114 first remove rind 88 from the melon's equator 116. The blades 128 are dimensioned, so that the peeling surface 130 thereof removes rind 88 without removing the flesh 104 from the melon 28. The gearbox 34 of the rotating means 24 rotates the carriage assembly 22 from the initial position toward the completed position.

As the carriage assembly 22 rotates the melon 28 about its axis from the initial position to the completed position, the revolving means 74 revolve the melon 28 on its axis, with the blades 128 of the knife members 114 continuously removing rind 88. Both knife members 114 simultaneously remove the rind 88 in an efficient cutting pattern that extends from the melon's equator 116 and simultaneously precesses toward each pole 92. Thus, the cutting pattern provided by the present invention 10 obviates the need for substantial rotation of the carriage assembly 22, for providing a processing apparatus having enhanced processing speeds.

Preferably, the carriage assembly 22 is rotated less than approximately 90°, and most preferably approximately 80°, from the initial position to the completed position, while the knife members 114 remove rind from greater than approximately 220° of the melon's surface. Therefore, when the carriage assembly 22 reaches the completed position, almost the entire rind 88 has been removed, without removing superfluous flesh 104 from the melon 28.

While the carriage assembly 22 is rotating the melon 28 for removing its rind 88, the receiving assembly 176 is activated for adjusting the bowl 180 into the receiving position, wherein the bowl 180 is positioned beneath the melon 28, when the carriage assembly 22 is in the completed position for receiving the processed melon 28.

When the carriage assembly 22 has reached the completed position, the knife members 114 are withdrawn from the melon 28, and the floating cutting assembly 22 returns to its initial position. The pole cutting members 96 are then actuated for simultaneously rotating the cutting members 96 from the home position, to the extended position, wherein the blades 100 have extended through the melon's poles 92 and the rind 88 is removed. Once the rind 88 is removed from the poles 92, the melon 28 no longer has rind over any portion of its surface 154. The melon 28 is released from the mandrels 76 and is discharged into the bowl 180 of the receiving assembly 176. The receiving assembly 16 is then activated for conveying the bowl 180 from the receiving position to the discharge position, for enabling further processing of the melon. The cutting members 96 remove the rind 88 from the poles 92, without removing excessive flesh 104 from the melon 28. After the melon 28 is discharged into the receiving assembly 16, the spring means 94 push outwardly on any rind 88 remaining on the blades 90 for releasing rind 88 retained thereon.

The rotating means 24 then returns the carriage assembly 22 to the initial position, along with the support arms 48 being spread, for returning the assembly 22 the initial position for receiving the next melon 28 to be processed and completing a processing cycle. Processing cycles can be continuously repeated for processing as many melons 28 as desired. The invented apparatus 10 performs a processing cycle in approximately 10 seconds, and preferably 8 seconds, enabling the invention 10 to process approximately 12 melons per minute, for providing an efficient processing apparatus.

Thus, there has been described an improved processing apparatus and method for removing rind from a spheroidal food article, such as a melon. The invented apparatus includes infeed and outfeed componentry for conveying melons to be processed into and out of the apparatus, providing an apparatus well suited for use in an automated environment. The positioning means provides precise orienting of the melon and positive retainment of the melon. The mandrels retain the melon on its axis and revolve the melon on its equator. The knife members include blades to accommodate rinds of different thicknesses, so that the blades extend through the rind, without extending into the flesh. The rollers are secured to the knives to control the cutting depth of the blades and enhance the ease with which the rind is cut. As the melon is rotated from the initial positron toward a completed position, the knifes initially remove rind from its equator, then simultaneously toward each pole, for removing substantially the entire rind from the melon. The cutting pattern provided by the invention obviates the need for excessive rotation of the melon, providing a processing apparatus having enhanced processing speeds. The invented apparatus is capable of processing a melon every approximately 8 seconds. Rind remaining on the poles is sliced off without removing excessive flesh from the melon for completely removing rind from the melon.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An apparatus for removing rind from a spheroidal food article, the apparatus comprising:

an infeed assembly for receiving a food article to be processed;

a processing assembly for processing the food article, the processing assembly comprising;

carriage means for rotating the food article about a first axis passing through the food article, the carriage means including revolving means for retaining the food article on its axis and for revolving the food article on its equator, and actuation means coupled to the revolving means for oscillating the revolving means between an engaged position, wherein a food article interposed between the revolving means is engaged by the revolving means, and a retracted position, wherein a sufficient distance between the revolving means is provided for placing a food article between the revolving means;

at least one peeling means for removing rind from the food article as the food article is rotated about the first axis by the revolving means, the peeling means positioned on either side of the food article and aligned with the equator thereof;

means for rotating the carriage means to rotate the first axis of the food article toward a second axis, the second axis being approximately perpendicular to the first axis, the rotating means rotating the carriage means from an initial position to a completed position, the peeling means sequentially removing rind from the food article as the carriage means is rotated from the initial position to the completed position in a multiplicity of circular paths thereabout for removing rind from the surface of the food article to process the food article; and a discharge assembly for receiving a processed food article from the processing assembly.

2. The apparatus of claim 1 wherein the infeed assembly includes:

positioning means for positioning and supporting a food article thereon, the positioning means including retaining means for retaining the food article on the positioning means; and conveyance means for conveying the food article between an infeed position, wherein the food article is positioned a distance from the processing assembly and a processing position, wherein the food article is interposed between the revolving means.

3. The apparatus of claim 1 wherein the discharge assembly includes:

a food article receiving assembly for receiving a processed food article; and conveyance means for conveying the food article receiving assembly between a receiving position, wherein the receiving assembly is positioned in the processing assembly for receiving the processed food article and a discharge position, wherein the receiving assembly is conveyed from the processing assembly to a discharge location for enabling a user to receive the processed food article.

4. The apparatus of claim 3 wherein the discharge assembly further includes a tilting means for rotating the food article receiving assembly between a receiving position, wherein the receiving assembly is in a planer position, and a discharge position, wherein the receiving assembly is in an inclined position for dislodging the food article from the receiving assembly.

5. The apparatus of claim 1 further comprising drive means coupled to the revolving means and to the rotating means, the drive means driving the revolving means at a first predetermined velocity and driving the rotating means at a second predetermined velocity, the first predetermined velocity being approximately thirty times faster than the second predetermined velocity.

6. A processing apparatus for processing a spheroidal food article, the apparatus comprising:

a frame;

an infeed assembly for receiving a food article to be processed, the infeed assembly including positioning means for positioning and supporting a food article thereon, and conveyance means for conveying the food article between an infeed position and a processing position;

a processing assembly for processing the food article, the processing assembly comprising;

a carriage assembly for retaining a spheroidal food article on its axis and for revolving the food article on its equator, the carriage assembly including, upper and lower support arms extending generally perpendicularly to a first axis when the carriage assembly is in an initial position, actuation means coupled to the support arms for increasing a distance between the arms and for decreasing the distance between the arms, revolving means for retaining the food article on its axis and for revolving the food article on its equator, the revolving means comprising a pair of inwardly projecting, diametrically opposed mandrels extending generally parallel to the first axis when the carriage assembly is in the initial position, the mandrels coupled to drive means for rotating the mandrels, means for rotating the carriage assembly to rotate the first axis of the food article toward a second axis, the second axis approximately perpendicular to the first axis, the rotating means rotating the carriage means from an initial position to a completed position wherein the first axis of the food article extends obtusely to the second axis, a floating cutting assembly coupled to the frame, the cutting assembly including a pair of slidable arms for adjusting the spatial positioning therebetween and a pair of diametrically opposed knife members, each arm having a knife member coupled thereto, the arms configured to align the knife members with the equator of a food article when the carriage assembly is in the initial position, each knife member having a blade secured thereto for removing the rind from the food article, the blades of the knife members dimensioned to extend through the rind without extending substantially into the flesh of the food article for preventing superfluous flesh from being removed from the food article, wherein the revolving means revolves the food article on its equator so that the knife members initially remove rind from the food article along the equator thereof, the rotating means rotating the carriage assembly toward the completed position for rotating the food article about its axis causing both knife members to simultaneously remove the rind from the food article in an outwardly spiraling path extending from the equator and simultaneously precessing toward each pole of the food article in cutting pattern that removes the entire rind from the food article for processing the food article, while substantially limiting rotation of the carriage assembly between the initial position and completed position for increasing processing speed of the apparatus;

means for slicing rind remaining on poles of the food article and for releasing the rind from the revolving means, the slicing means comprising upper and lower pole cutting members, each cutting member having an elongated cutting blade shaped to extend adjacent to the associated revolving means for removing rind from the pole of the food article without extending substantially into the flesh thereof; and a discharge assembly for receiving a processed food article from the processing assembly, the discharge assembly including a food article receiving assembly for receiving the processed food article and conveyance means for conveying the food article receiving assembly between a receiving position, wherein the receiving assembly is positioned in the processing assembly for receiving the processed food article and a discharge position, wherein the receiving assembly is conveyed from the processing assembly to a discharge location for enabling a user to receive the processed food article.

7. The apparatus of claim 6 wherein the infeed assembly further comprises:

an infeed platform secured to the frame, the positioning means comprising a plurality of spatially positioned, substantially flexible cups arranged in a triangular configuration, the positioning means including retaining means for retaining the food article on the cups;

the conveyance means comprising a plurality of guide rails extending beneath the platform, the guide rails preventing inadvertent horizontal movement of the positioning means to aid with retaining the food article in the positioning means, when the positioning means is conveyed from the infeed position to the processing position; and actuation means for causing the infeed assembly to convey a food article from the infeed position and the processing position and for returning the infeed assembly to the infeed position.

8. The apparatus of claim 6 wherein the retaining means comprises a vacuum source coupled to a desired one of the cups for applying a suction force thereto, the suction force retaining the food article on the cups to prevent the food article from inadvertently detaching from the positioning means and for maintaining a preferred orientation of the food article relative to the mandrels, for ensuring that the poles thereof are engaged thereby.

9. The apparatus of claim 6 wherein the revolving means further include an engagement assembly for coupling the food article thereto, the engagement assembly comprising a plurality of engagement blades dimensioned to extend slightly into the rind of the food article for engaging the food article at poles thereof, the engagement assembly further including spring means for releasing rind retained on the blades when the food article is released by the engagement assembly.

10. The apparatus of claim 6 wherein the carriage assembly is rotated approximately 90 degrees from the initial position to the completed position, both knife members simultaneously removing the rind from the food article in an outwardly spiraling path extending from the equator and simultaneously precessing toward each pole of the food article in cutting pattern that removes rind from approximately 220 degrees of the surface area of the food article within the approximately 90 degrees of rotation of the carriage assembly, a remaining portion of the rind on the poles thereof removed by the slicing means for removing substantially the entire rind from the food article and for increasing processing speed of the apparatus.

11. The apparatus of claim 10 wherein the carriage assembly is rotated approximately 80 degrees from the initial position to the completed position for removing the rind from approximately 220 degrees of the surface area of the food article within the approximately 80 degrees of rotation of the carriage assembly.

12. The apparatus of claim 6 wherein the apparatus processes a food article in less then 12 seconds.

13. The apparatus of claim 12 wherein the apparatus processes a food article in approximately 8 seconds.

14. The apparatus of claim 6 wherein the discharge assembly further includes:

a discharge table coupled to the frame for receiving processed food articles from the processing assembly, the food article receiving assembly including a concave bowl dimensioned to receive a processed food article, the conveyance means for adjusting the bowl between a receiving position and a discharge position, the conveyance means including a pair of horizontal guide rails supporting the receiving assembly and pneumatic actuation means for adjusting the assembly between the discharge and receiving positions; and a tilting mechanism coupled between the actuation means and receiving assembly, the tilting mechanism including a pneumatic source for rotating the bowl between a receiving position, wherein the periphery of the bowl is normal to the discharge table, and a discharge position, wherein the periphery of the bowl is inclined relative to the discharge table for dislodging a processed food article retained therein to enable a user to receive the food article, the tilting mechanism further including a cantilevered arm for raising the bowl when the assembly is in the receiving position, and for lowering the bowl when the assembly is in the discharge position.

15. The apparatus of claim 7 wherein the infeed assembly further includes means for preventing inadvertent horizontal movement of the positioning means as the positioning means is conveying the food article from the infeed position to the processing position.

16. The apparatus of claim 6 further comprising drive means coupled to the revolving means and to the rotating means, the drive means driving the revolving means at a first predetermined velocity and driving the rotating means at a second predetermined velocity, the first predetermined velocity being approximately thirty times faster than the second predetermined velocity.

17. The apparatus of claim 6 wherein the floating cutting assembly further comprises:

the downwardly projecting arms slidably coupled to the frame;

an actuation source for adjusting the spatial positioning of the arms, the actuation source adjusting the arms between an initial position wherein there is a sufficient distance between the arms to dispose a food article therebetween, and an engaged position, wherein the arms are adjusted towards each other, for removing rind from the food article;

a knife member coupled to the projecting portion of each arm, the knife members positioned on the projecting portions, such that the knives project inwardly toward the revolving means and oriented, such that the knives are diametrically opposed along the equator of the food article, when the carriage assembly is in the initial position, each knife member secured to the corresponding arm portion with a gimbaled head for allowing the knives to oscillate along the surface of the food article for tracking the curvature of the surface, each knife member including, a mounting plate and a complementary formed holding plate for supporting a peeling blade assembly, the peeling blade assembly including a U-shaped peeling blade having an inclined peeling surface attached to a mounting bracket for detachably coupling the blade to the blade assembly, the inclined surface of the blade of each knife member having a particular peeling blade inclination to enhance cutting depth control thereof, as each knife member brought toward its respective pole, when processing the food article, for preventing superfluous flesh from being removed from the food article, different blades being selectable for accommodating varying thicknesses of the rinds of different food articles, so that the peeling surface of the blades extends through the rind of the food article, without extending substantially into the flesh thereof.

18. The apparatus of claim 17 wherein the floating cutting assembly further comprises:

at least one roller fastened to the mounting bracket adjacent to the peeling blade, the rollers provided to enhance the ease with which the knife members pass over the surface of the food article for providing a cleaner cut of the rind and increasing cutting and processing speed of the apparatus, the rollers further providing facile the removal of rind remaining between the inclined peeling surface and the rollers; and tracking means for enabling the knife members to track changes in the curvature of the surface of the food article, the tracking means preferably causing the rollers to exert a slight, even pressure on the rind, to aid with maintaining a constant cutting depth of the blades, while preventing superfluous flesh from being removed from the food article, the tracking means comprising a tension assembly secured to the frame and coupled to the arms, the tension assembly causing the knife members to exert approximately 8 to approximately 15 pounds of pressure on the rind 88 for maintaining the cutting depth of the blades, the tension assembly in combination with the gimbaled head of the knife members, inclined peeling surface of the blades, and dimensioning of the blades coacting to provide optimal cutting of the rind, while preventing superfluous flesh from being removed from the food article, for providing optimal processing of the food article.

19. The apparatus of claim 17 wherein the knife members are coupled to a power source for reciprocating the knife members at a fairly high rate.

20. The apparatus of claim 6 wherein the apparatus is capable of processing spheroidal food articles having a diameter ranging from approximately 4 inches to approximately 10 inches.

* * * * *